(12) United States Patent
Arkin

(10) Patent No.: US 8,811,224 B2
(45) Date of Patent: Aug. 19, 2014

(54) METHOD AND SYSTEM FOR DETERMINING PHYSICAL CONNECTIVITY IN A DYNAMIC NETWORK

(75) Inventor: Ofir Arkin, Carmiel (IL)

(73) Assignee: McAfee Ireland Holdings, Limited, Dublin (IE)

( * ) Notice: Subject to any disclaimer, the term of this patent is extended or adjusted under 35 U.S.C. 154(b) by 216 days.

(21) Appl. No.: 12/851,415

(22) Filed: Aug. 5, 2010

(65) Prior Publication Data

US 2010/0315975 A1    Dec. 16, 2010

Related U.S. Application Data

(63) Continuation-in-part of application No. 12/303,003, filed as application No. PCT/IL2007/000654 on May 30, 2007, now abandoned.

(60) Provisional application No. 60/808,984, filed on May 30, 2006.

(51) Int. Cl.
*H04L 12/28* (2006.01)
*G06F 15/173* (2006.01)

(52) U.S. Cl.
USPC .......................................... 370/254; 709/224

(58) Field of Classification Search
USPC .......................... 370/254, 255; 709/224, 223
See application file for complete search history.

(56) References Cited

U.S. PATENT DOCUMENTS

| 5,734,824 | A | 3/1998 | Choi |
| 6,108,702 | A * | 8/2000 | Wood ............................. 709/224 |
| 6,282,175 | B1 | 8/2001 | Steele et al. |
| 6,502,130 | B1 * | 12/2002 | Keeler et al. .................. 709/223 |
| 6,654,802 | B1 * | 11/2003 | Oliva et al. .................... 709/224 |
| 6,681,248 | B1 | 1/2004 | Sears et al. |
| 6,697,338 | B1 | 2/2004 | Breitbart et al. |
| 6,882,630 | B1 | 4/2005 | Seaman |
| 7,069,343 | B2 | 6/2006 | Goringe et al. |

(Continued)

FOREIGN PATENT DOCUMENTS

WO    WO 2005/053230 A2    6/2005

OTHER PUBLICATIONS

Arkin et al., "The Present and Future of Xprobe2: The Next Generation of Active Operating System Fingerprinting," 2003.

(Continued)

*Primary Examiner* — Hassan Phillips
*Assistant Examiner* — Saba Tsegaye
(74) *Attorney, Agent, or Firm* — Wong, Cabello. Lutsch, Rutherford & Brucculeri, LLP

(57) ABSTRACT

There are provided a system and a method of determining a physical connectivity of a new node connected to a dynamic communication network comprising a plurality of connecting nodes each comprising a plurality of ports. The method comprises: (a) responsive to automatically discovering a new node connected to the dynamic communication network, obtaining address data characterizing a network address of said discovered new node; (b) querying all known connecting nodes and generating a port dataset representing all ports thereof which have registered address data characterizing the network address of said discovered new node; (c) defining, by analyzing the generated port dataset, a port and respective connecting node which said discovered new node is directly connected to.

18 Claims, 6 Drawing Sheets

(56) References Cited

U.S. PATENT DOCUMENTS

| | | | | |
|---|---|---|---|---|
| 7,275,113 | B1* | 9/2007 | Araujo | 709/245 |
| 2002/0133622 | A1* | 9/2002 | Pinto | 709/242 |
| 2004/0213211 | A1* | 10/2004 | Green | 370/352 |
| 2005/0099954 | A1 | 5/2005 | Mohan et al. | |
| 2006/0023640 | A1 | 2/2006 | Chang et al. | |
| 2006/0047907 | A1* | 3/2006 | Shiga et al. | 711/114 |
| 2007/0201385 | A1* | 8/2007 | Goto et al. | 370/254 |
| 2010/0005160 | A1* | 1/2010 | Sparks | 709/222 |
| 2010/0098410 | A1* | 4/2010 | Krishnaswamy et al. | 398/16 |

OTHER PUBLICATIONS

Lowekamp et al., "Topology Discovery for Large Ethernet Networks," *SIGCOMM '01*, Aug. 27-31, 2001, San Diego, CA, USA.
Breitbart et al., "Topology Discovery in Heterogeneous IP Networks," *INFOCOM 2000*, Mar. 2000.
Bejerano et al., "Physical Topology Discovery for Large Multi-Subnet Networks," *INFOCOM 2003*.
Perlman, Radia., "Interconnections: bridges, routers, switches, and internetworking protocols," *Addison-Wesley Professional Computing Series*, $2^{nd}$ Edition, 2000, pp. 45-93 and 127-144.

\* cited by examiner

METHOD AND SYSTEM FOR DETERMINING PHYSICAL CONNECTIVITY IN A DYNAMIC NETWORK

CROSS-REFERENCES TO RELATED APPLICATIONS

This application is a continuation-in-part of U.S. patent application Ser. No. 12/303,003 filed on Dec. 1, 2008, that is now abandoned, which in turn is a national phase of PCT Application No. PCT/IL2007/000654 filed May 30, 2007 and claiming priority from U.S. Provisional Patent Application No. 60/808,984 filed on May 30, 2006. The disclosures of those applications are hereby incorporated herein by reference in their entirety.

FIELD OF THE INVENTION

The present invention relates, in general, to the field of communication networks, and more specifically, to methods and systems capable of determining topology of a dynamic communication network.

BACKGROUND OF THE INVENTION

The problems of collecting and analyzing information related to a communication network and/or network topology have been recognized in the Prior Art and various systems have been developed to provide a solution, for example:

International Patent Application No. WO2005/053230 entitled "Method and System for Collecting Information Relating to a Communication Network" discloses a method and a system for collecting information relating to a communication network. Data conveyed by nodes operating in the communication network is detected in a manner that is transparent to the nodes. The detected data is analyzed for identifying information relating to the communication network and for identifying missing information. In order to complete the missing information, one or more of the nodes are queried.

The article "*The Present and Future of Xprobe2, the Next Generation of Active Operating System Fingerprinting*" (Ofir Arkin et al., published on the Internet in July 2003, see http://www.sys-security.com/archive/papers/Present_and_Future_Xprobe2-v1.0.pdf) describes a system performing active operating system fingerprinting. According to *The Present and Future of Xprobe2*, active operating system fingerprinting is the process of actively determining a targeted network node's underlying operating system by probing the targeted system with several packets and examining the response(s) received.

"*Topology discovery for Large Ethernet Networks*" (Bruce Lowekamp et al., SIGCOMM '01, Aug. 27-31, 2001, San Diego, Calif., USA) teaches how to determine the connection between a pair of bridges that share forwarding entries for only three hosts, requiring access to only one endpoint to perform the queries needed for topology discovery.

"*Topology discovery in heterogeneous IP networks*" (Y. Breitbart et al., in proceedings of INFOCOM 2000, March 2000) describes discovering physical topology in heterogeneous (i.e., multi-vendor) IP networks, relying on standard SNMP MIB information. The method of Breitbart et al. can discover the physical network topology in time that is roughly quadratic in the number of network elements.

"*Physical Topology Discovery for Large Multi-Subnet Networks*" (Y. Bejerano et al., in proceedings of INFOCOM 2003) describes an algorithmic solution for discovering the physical topology of a large, heterogeneous Ethernet network comprising multiple subnets as well as dumb or uncooperative network elements. The algorithm relies on standard SNMP MIB information.

U.S. Pat. No. 5,933,416 entitled "Method of determining the topology of a network of objects" discloses a method of determining the existence of a communication link between a pair of devices. The method comprises measuring traffic output from one device of the pair of the devices, measuring the traffic received by another device of the pair of devices, and declaring the existence of the communication link in the event the traffic is approximately the same.

U.S. Pat. No. 6,628,623 entitled "Methods and systems for determining switch connection topology on Ethernet LANs" discloses a method of determining an Ethernet LAN switch topology including the steps of a) establishing a communications link between a network management server and a switch in an Ethernet LAN, thereby defining the switch as a root switch, b) identifying each of a plurality of switches attached to the Ethernet LAN, each of the plurality of switches includes at least one identifiable port, c) generating a mapping of each of the switches, the mapping including a list for each of the ports of the switches that each of the ports sees, d) eliminating from the mapping each upwardly looking one of the ports, e) identifying in the mapping at least one leaf connected to at least one of the ports, f) maintaining in a topological mapping at least one relationship between the leaves and the ports connected to the leaves, g) eliminating from the list for each of the ports each of the leaves that each of the ports sees, and h) repeating steps e)-g) until all of the leaves are identified.

U.S. Pat. No. 6,697,338 entitled "Determination of physical topology of a communication network" discloses a method of determining physical connectivity between elements such as switches and routers in a multiple subnet communication network. Each element has one or more interfaces each of which is physically linked with an interface of another network element. Address sets are generated for each interface of the network elements, wherein members of a given address set correspond to network elements that can be reached from the corresponding interface for which the given address set was generated. The members of first address sets generated for corresponding interfaces of a given network element, are compared with the members of second address sets generated for corresponding interfaces of network elements other than the given element. A set of candidate connections between an interface of the given network element and one or more interfaces of other network elements, are determined. If more than one candidate connection is determined, connections with network elements that are in the same subnet as the given network element are eliminated from the set.

SUMMARY OF THE INVENTION

In accordance with certain aspects of the subject matter of the present application, there is provided a method of determining a physical connectivity of a new node connected to a dynamic communication network comprising a plurality of connecting nodes each comprising a plurality of ports. The method comprises: (a) responsive to automatically discovering a new node connected to the dynamic communication network, obtaining address data characterizing a network address of said discovered new node; (b) querying all known connecting nodes and generating a port dataset representing all ports thereof which have registered address data characterizing the network address of said discovered new node; (c)

defining, by analyzing the generated port dataset, a port and respective connecting node which said discovered new node is directly connected to.

The connecting nodes may be known from a previously provided process of determining a physical connectivity in the dynamic communication network. The port dataset may be generated in accordance with SNMP MIB data received from the connecting nodes responsive to querying, in accordance with data received from the connecting nodes by querying via remote log-in into the connecting nodes, and/or otherwise.

Analyzing the port dataset may comprise processing data related to the ports represented in the port dataset in order to discover a port which is not an inter-switch port or a switch-router port, thereby discovering the port directly connected to the discovered new node. The discovered new node may be initially classified as an end-node and respective directly connected port may be initially classified as an end-node port. This discovered new node may be further re-classified as a connecting node and respective directly connected port may be further re-classified as an inter-switch port or a switch-router port responsive to results of a network connectivity analysis.

In accordance with other aspects of the subject matter of the present application, there is provided a system capable to determine a physical connectivity of a new node connected to a dynamic communication network comprising a plurality of connecting nodes each comprising a plurality of ports. The system comprises: (a) means for obtaining, responsive to automatically discovering a new node connected to the dynamic communication network, address data characterizing a network address of said discovered new node; (b) means for querying connecting nodes and receiving respective responses, wherein said means are configured to query known connecting nodes with respect to ports thereof which have registered address data characterizing the network address of said discovered new node; (c) means for generating a port dataset in accordance with responses received from the queried connecting nodes, wherein said port dataset presents ports which have registered address data characterizing the network address of said discovered new node; and (d) means for analyzing the generated port dataset in order to define a port and respective connecting node directly connected to said discovered new node.

The system may further comprise a memory configured to maintain data related to the known connecting nodes. The system may further comprise communication means operative to receive data related to the known connecting nodes from an external memory.

The system may further comprise means for classifying the discovered new node, wherein said means may be configured to initially classify the discovered new node as an end-node and to initially classify respective directly connected port as an end-node port, and, responsive to results of a network connectivity analysis, to further re-classify the discovered new node as a connecting node and to respective directly connected port as an inter-switch port or a switch-router port.

Among advantages of certain embodiments of the present invention is facilitating real time or near real time determining physical connectivity of a newly connected node.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
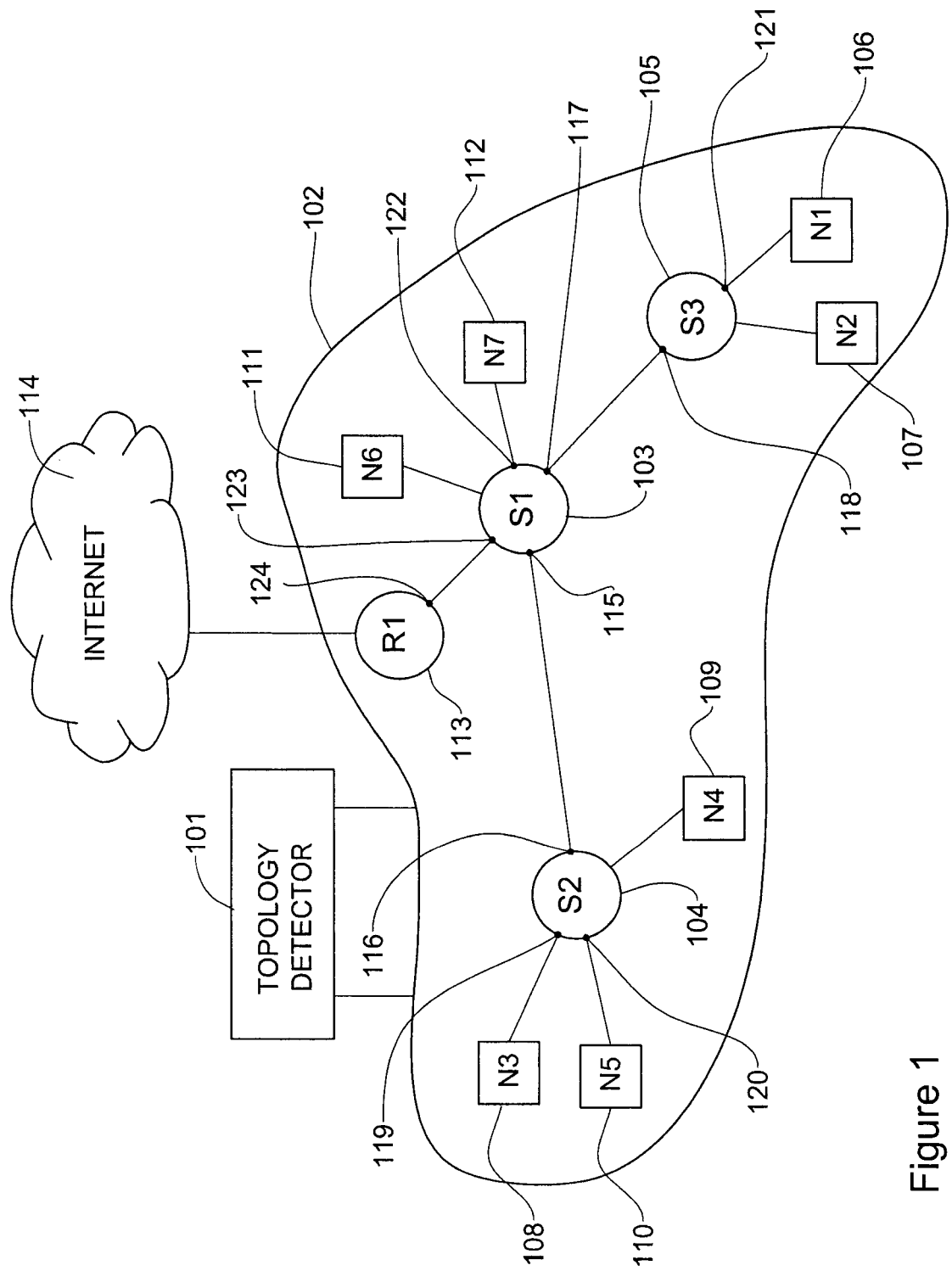
FIG. 1 is a schematic illustration of a communication network in conjunction with a topology detector in accordance with certain embodiments of the present invention.

In the following detailed description, numerous specific details are set forth in order to provide a thorough understanding of the invention. However, it will be understood by those skilled in the art that the present invention can be practiced without these specific details. In other instances, well-known methods, procedures, components and circuits have not been described in detail so as not to obscure the present invention. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "determining", "generating", "activating", "reading", "writing", "classifying" or the like, refer to the action and/or processes of a computer that manipulate and/or transform data into other data, said data represented as physical, such as electronic, quantities and/or representing the physical objects. The term "computer" should be expansively construed to cover any kind of electronic system with data processing capabilities.

The operations in accordance with the teachings herein can be performed by a computer specially constructed for the desired purposes or by a general purpose computer specially configured for the desired purpose by a computer program stored in a computer readable storage medium.

Embodiments of the present invention are not described with reference to any particular programming language. It will be appreciated that a variety of programming languages can be used to implement the teachings of the inventions as described herein.

The references cited in the background teach many principles of storage virtualization that are applicable to the present invention. Therefore the full contents of these publications are incorporated by reference herein for appropriate teachings of additional or alternative details, features and/or technical background.

Bearing this in mind, attention is drawn to FIG. 1 illustrating a schematic diagram of communication network architecture applicable to certain embodiments of the present invention. The term "communication network" used in this patent specification should be expansively construed to cover any kind of network constituted by a collection of nodes and links therebetween arranged so that communication objects (e.g. data, voice, video, messages, etc.) can be passed from one node to another, optionally over multiple links and through various nodes. Non-limiting examples of communication networks are computer networks, telecommunication networks, storage networks, etc. Optionally, a communication network can comprise several physical or virtual sub-networks interconnected therebetween.

As illustrated by way of non-limiting example, a topology detector 101 is operatively coupled to a communication network 102 comprising three switches, 103, 104 and 105. Terminal nodes 106 and 107 are coupled to the switch 105, terminal nodes 108, 109 and 110 are coupled to the switch 104, and terminal node 111 is coupled to the switch 103. The switch 103 is coupled also to a router 113 connecting the network 102 and the nodes being part thereof to the Internet 114. The illustrated network 102 comprises switches 103, 104, 105, terminal nodes 106-111 and router 113. Each node can be characterized, amongst other things, by a classification indicative of the type of the node, wherein a node can be classified, for example, as a switch, a router, a host, a printer, a terminal, etc. In addition, switches and routers are joined under a single super-classification constituting "connecting nodes". All other illustrated nodes constitute together "end nodes".

For purpose of illustration only, the following description is provided for the topology detector configured as an external entity with respect to the communication network 102. Those skilled in the art will readily appreciate that the teachings of the present invention are applicable in a similar manner to the topology detector configured as a separate node of the communication network 102 or integrated, fully or partly, with one or more nodes of the communication network 102.

According to certain embodiments of the present invention, the topology detector 101 is configured to maintain network data. Network data include connectivity data, node data and address data characterizing respective nodes in the network.

The term "connectivity data" used in this patent specification should be expansively construed to cover any kind of data characterizing a physical interconnection between two nodes. For example, if a first node is a connecting node, connectivity data can include respective ports in the connecting node and a node coupled thereto. The connectivity data characterizing the nodes comprised in a communication network can be used for analyses of network connectivity as further detailed with reference to FIG. 3.

The term "node data" used in this patent specification should be expansively construed to cover any kind of data characterizing a set of nodes constituting the communication network or a part thereof (e.g. a list of nodes comprised in the network). In the example of FIG. 1, the node data characterizes the set including nodes {103, 104, 105, 106, 107, 108, 109, 110, 111}. It is appreciated that in order to determine which nodes are represented in the node data, those versed in the art may apply, by way of non-limiting example, the method of collecting information relating to a communication network disclosed in International Application No. WO 2005/053230 assigned to the assignee of the present application and incorporated hereby by reference in its entirety.

The term "address data" used in this patent specification should be expansively construed to cover any kind of data characterizing network address of each node (e.g. respective MAC or other Layer 2 addresses). By way of non-limiting example, MAC address of each node can be determined as disclosed in International Application No. WO 2005/053230.

In accordance with certain embodiments of the present invention, the topology detector 101 can be configured to monitor the communication network 102 and automatically discover the nodes constituting the network or a part thereof. The topology detector can be further configured to apply passive and/or active methods for collecting information with regard to the discovered nodes.

Note that the invention is not bound by the specific architecture of the communication network described with reference to FIG. 1. Those versed in the art will readily appreciate that the invention is, likewise, applicable to any communication network and/or parts thereof comprising nodes capable to convey network data to the topology manager.

Figure 2:
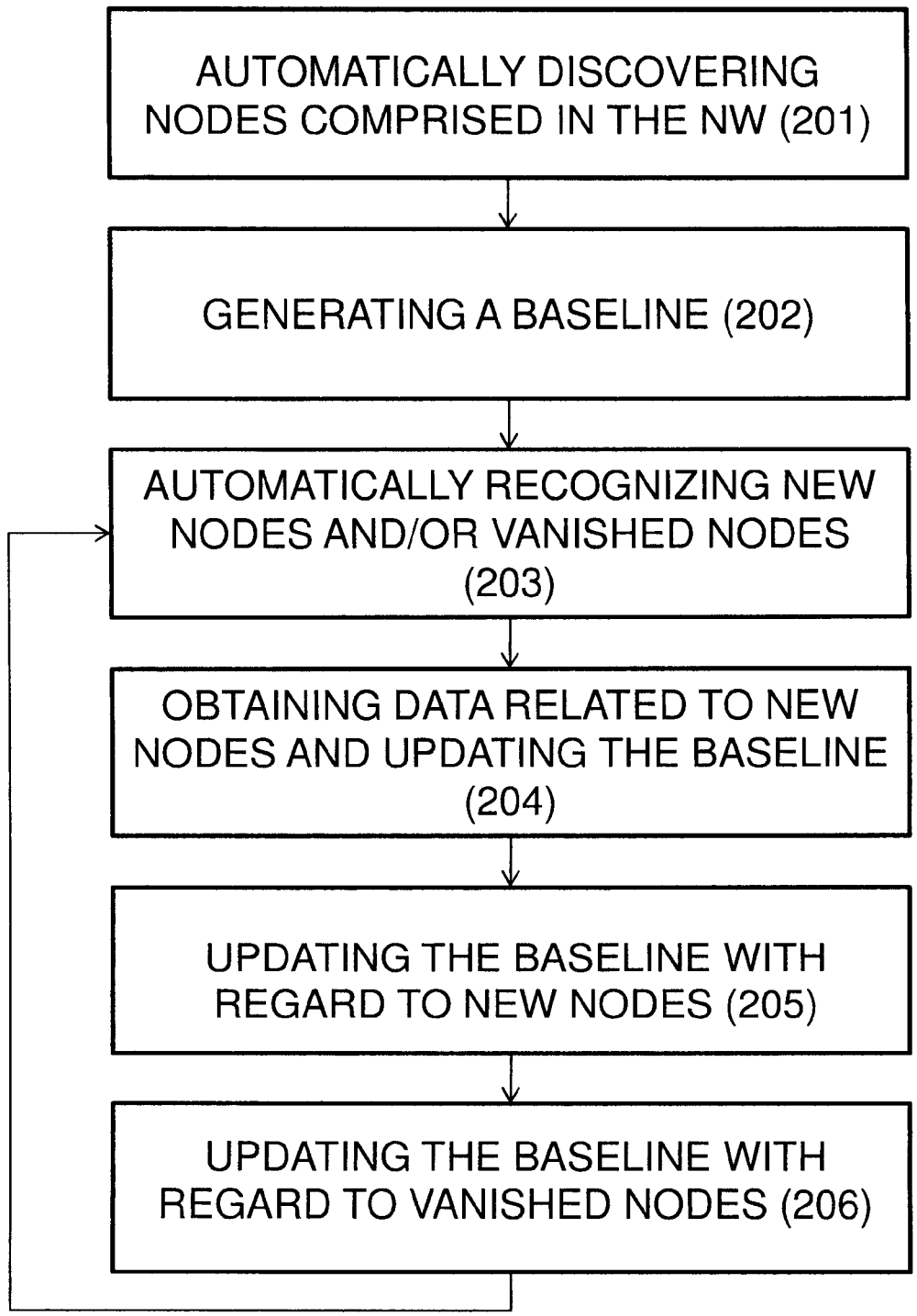
FIG. 2 is a generalized flowchart illustrating a process of determining topology of a dynamic communication network in accordance with certain embodiments of the present invention.

FIG. 2 is a generalized flowchart illustrating a process of determining topology of a dynamic network according to certain embodiments of the present invention. It should be appreciated that a communication network (illustrated as network 102) can be a dynamic network wherein new nodes can be connected thereto from time to time, while vanished nodes can be disconnected therefrom. The embodiment illustrated hereinafter provides a method for determining topology of a dynamic network.

Upon startup, the topology detector 101 automatically discovers (201) all nodes comprised in the communication network or a part thereof, and reveals respective connectivity and address data, thereby generating (202) a "baseline" characterizing currently disclosed nodes. It should be appreciated that the baseline data can be stored in a memory of the topology detector 101 or in an external memory device accessible to the topology detector 101, while the memory device can be a short term memory device (such as Random Access Memory, RAM) or a long term memory device (such as a disk, flash memory etc.).

The topology detector further monitors the dynamic network 102 and recognizes (203) events of connecting one or more new nodes (illustrated as node 112) to the network and/or events of disconnecting one or more vanished nodes from the dynamic network. By way of non-limiting example, such events can be determined in real-time or near real-time modes with the help of methods disclosed in International Patent Application No. WO 2005/053230. As will be further detailed with reference to FIG. 4, the topology detector 101 further determines (204) the respective address data and connectivity data of each recognized new node and amends (205) the baseline so as to update the node data, and to include the respective address data and connectivity data of each new node. As will be further detailed with reference to FIG. 5, data representative of each vanished node, as well as its respective address data and connectivity data, is removed (206) from the network data.

It should be appreciated that the flowchart of FIG. 2 is non-limiting and other alternatives may exist. For example, it was previously explained that each of the node data, the address data and the connectivity data are stored in a short or long term memory device. Therefore, those versed in the art would appreciate that instead of determining the node data, and/or the address data and/or the connectivity data, it is possible to obtain any one of them, e.g., by reading them from disk, obtaining them from the communication network etc. Generally, therefore, the network data is considered to be maintained, wherein maintaining includes determining and/or obtaining.

Figure 3:
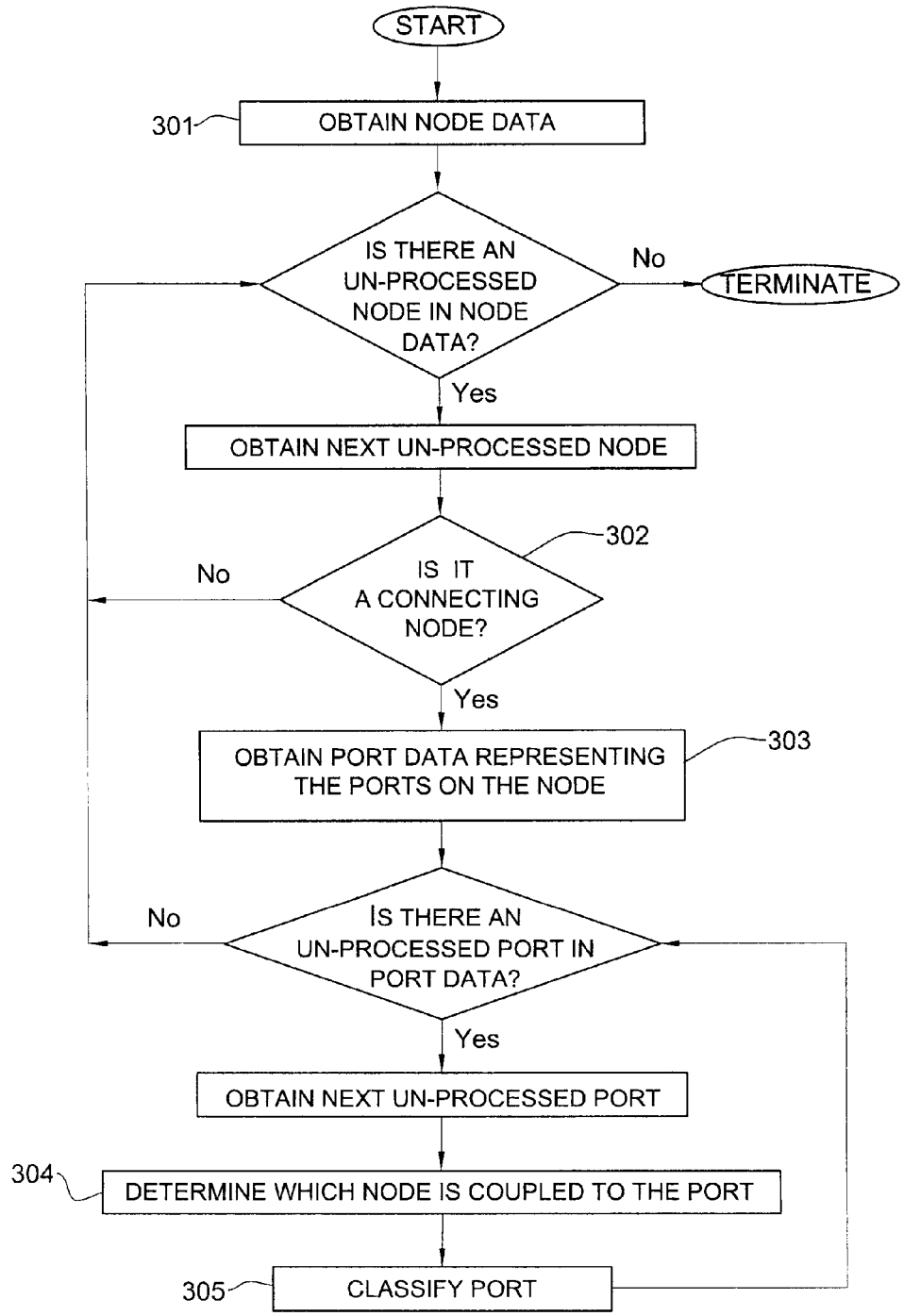
FIG. 3 is a generalized flowchart illustrating a process of determining network connectivity as known in the art.

FIG. 3 is a generalized flowchart illustrating determining network physical connectivity as known in the art. Connectivity of a port can be classified, by way of non-limiting example, as an "inter-switch connecting port", "switch-router connecting port" and "end-node port". An inter-switch connecting port is a port on a switch, in use for connecting to another switch. In the example in FIG. 1, four inter-switch connecting ports are illustrated. Specifically, they are referenced by reference numerals 115, 116, 117 and 118. A switch-router connecting port is a port on a switch in use for connecting to a router. A port on a router in use for connecting to a switch is also classified as a switch-router connecting port. Hence, in the example of FIG. 1, wherein only one router is depicted (113), there are two switch-router connecting ports, marked by the reference numerals 123 and 124. A port on a switch or on a router, in use for connecting to an end-node, constitutes an end-node port. End-node ports in the example of FIG. 1 are 119, 120, 121, 122 and others.

Further to obtaining node data (301), each node in the set of nodes represented by the node data is processed as follows: on 302 the classification of each un-processed node is checked, in order to determine whether this is a connecting node or an end node. If the node is an end-node, the next un-processed node is obtained from the node data. Alternatively, upon determining that the un-processed node is a connecting node, on 303 the "port data" of the node is obtained wherein the port data represents a set of ports on the connecting node. For each port in the port data, determine (on 304) the node coupled to the port, and on 305 the port is classified in accordance with the classification of the coupled node. It should be appreciated by those versed in the art that according to one embodiment obtaining port data (303) and determining which port is coupled to the port (on 304) can be performed using SNMP MIB information. Resulting from the above process of determining physical network topology, there can be provided switch dataset characterizing a set of switches comprised in the network and respective inter-switch connecting ports. By way of non-limiting example, the above discovering of physical network connectivity can be provided in accordance with techniques described in articles of Lowekamp et al. and Breitbart et al. cited in the Background of the present application.

However, known in the art methods of determining physical connectivity in a communication network require analyses of entire network data. Accordingly, such methods are computation consuming and can be inefficient for defining physical connectivity of new connected nodes in real-time/near real time modes.

Figure 4:
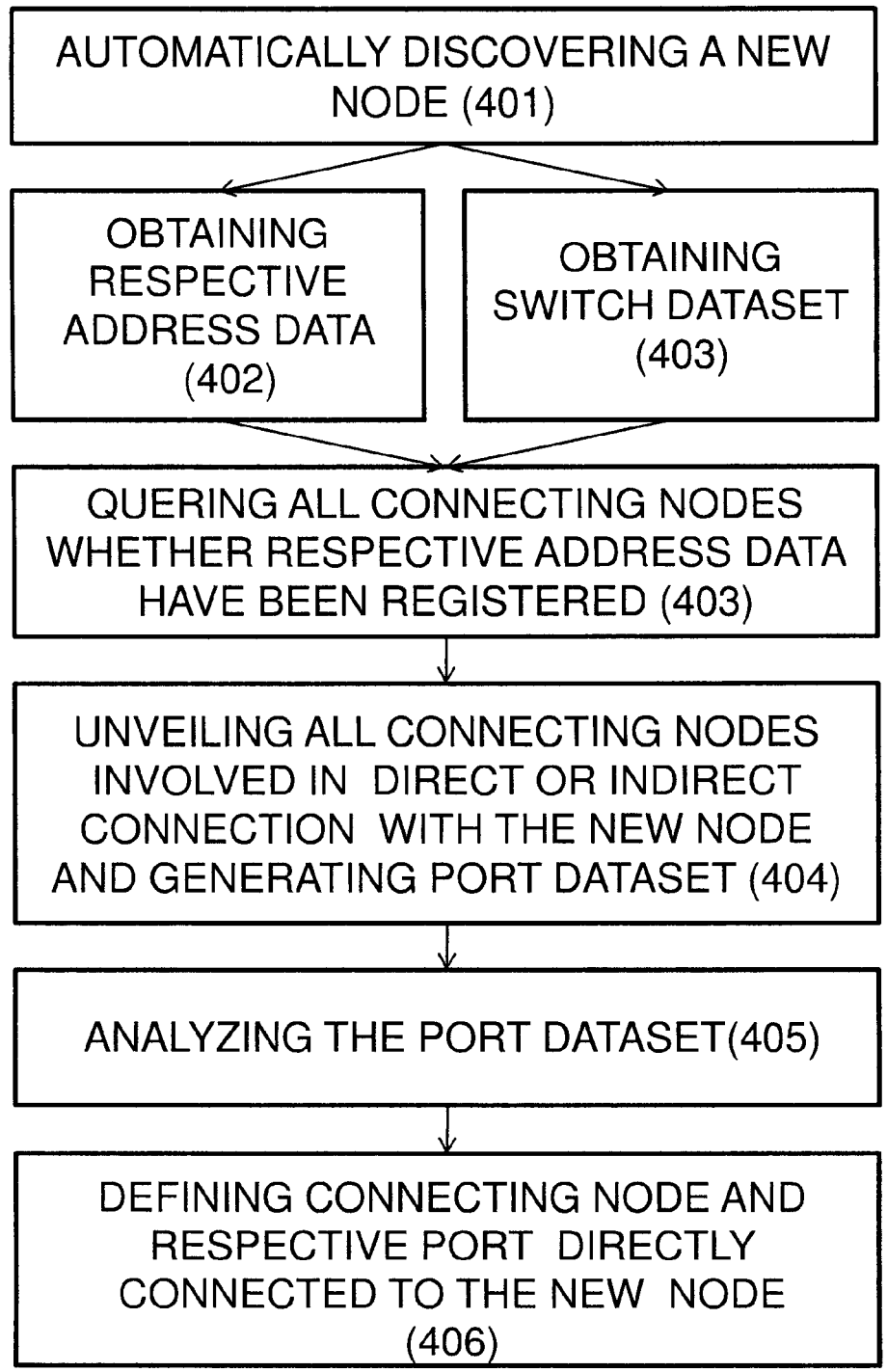
FIG. 4 is a generalized flowchart illustrating a process of determining connectivity of a new node in accordance with certain embodiments of the present invention.

FIG. 4 illustrates a generalized flowchart of determining physical connectivity of a new node in accordance with certain embodiments of the present invention. Responsive to automatically discovering (401) a new node (e.g. end-node illustrated as node 112) connected to the communication network 102, the topology manager 101 obtains (402) respective address data (e.g. MAC address or other Layer 2 address) of the discovered node. The topology manager further obtains (403) a switch dataset comprising all known connecting nodes. The switch dataset may be known in advance, generated in a manner detailed with reference to FIG. 3 or otherwise, and can be maintained in the memory of the topology manager or a memory of an external device available to the topology manager in any suitable form (e.g. as a list, a file, a database, etc.)

The topology manager sends (404) a request to all connecting nodes in the switch dataset querying if the respective address of the newly connected node has been registered on at least one port of the requested switch and/or router. By way of non-limiting example, layer 2 information about the connected nodes can be available through Simple Network Management protocol (SNMP). Based on received responses (e.g. on SNMP MIB data), the topology manager unveils (405) all switches (and/or routers) and respective ports involved in direct or indirect connection with the new node, and generates a port dataset representing in any suitable form, all switches and their respective ports which have registered the address of the new node.

Those versed in the art will readily appreciate that the information may be collected via remote log-in into a connecting node using the telnet or SSH services, or obtained by any other suitable method.

Direct connection to a certain connecting node means that the new node is a node directly coupled to a port of this certain switch (and/or router). Indirect connection to a certain connecting node means that the new node is directly coupled to another switch (and/or router), yet, the certain connecting node is familiar with the MAC address of the new node, i.e., the certain connecting node is directly or indirectly coupled to another switch (and/or router), and indirect connection between the certain connecting node and the new node is achieved via this another switch (and/or router).

The topology manager further analyzes (406) the generated port dataset and defines (407) the certain switch and respective port directly connected to the new node.

During such analysis, the topology manager processes ports comprised in the port dataset and checks their respective classification. If a port is determined to be an inter-switch port or a switch-router port with respect to the connecting nodes in the switch dataset, this implies that the coupling is indirect. The topology manager continues processing other ports of the presently processed switch, and/or of other switches and ports thereof in order to discover a port (and respective switch) directly connected to the new node, thus discovering connectivity of the new node. If a given port is not an inter-switch port or a switch-router port with respect to the connecting nodes in the switch dataset, this implies that the new node is directly coupled to the given port and hence to the respective switch.

In accordance with certain embodiments of the present invention any new node can be temporary classified as an end-node and a respective directly connected port can be temporary classified as an end-node port. The node can be re-classified as a connecting node responsive to respective results of on-going or periodical network connectivity analyses (e.g. as detailed with reference to FIG. 3), and classification of respective directly connected port can be, accordingly, altered as inter-switch port or switch-router port, and such new node can be added to the switch dataset.

In accordance with certain embodiments of the present invention, the topology manager can be configured to provide several parallel processes of determining physical connectivity of several new nodes, each such process provided responsive to discovering a respective new node by an ongoing discovery process.

Returning to 205 on FIG. 2, the new node's data, its respective address data, and the newly determined connectivity data are included in the updated baseline data.

The process of analyzing the generated port dataset can be further optimized, for example by cross-referencing with port-related information comprised in the switch dataset and eliminating analysis of data from the inter-switch ports pre-classified in the switch dataset.

Those versed in the art will readily appreciate that the process of determining physical connectivity of a new end-node detailed with reference to FIG. 4 can be implemented in a similar manner in a multi-subnet, single VLAN, multi-VLAN and other suitable environments.

Figure 5:
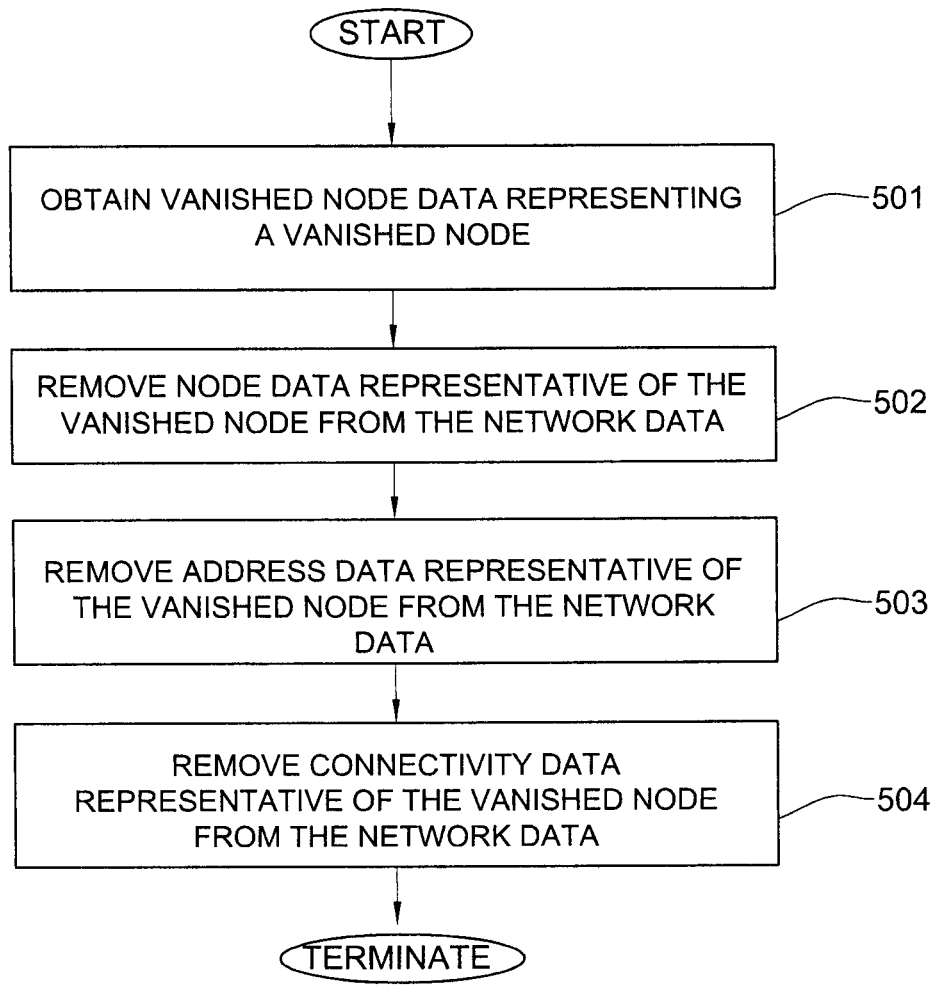
FIG. 5 is a generalized flowchart illustrating removing from the network data node data, address data and connectivity data respective to a vanished node, according to certain embodiments of the present invention.

FIG. 5 is a generalized flowchart illustrating removing node data, address data and connectivity data respective to a vanished node from the network data. According to certain embodiments of the present invention, upon obtaining (501) vanished node data representative of the vanished node, the topography detector removes (502) node data representative of the vanished node from the network data. The address data representative of the vanished node is further removed (503) from the network data, and the connectivity data representative of the vanished node is removed (504) from the network data. Hence, further to performing the operations described on 501, 502, 503 and 504 the respective connectivity data of all nodes in the network data are indicative of the updated network topology.

It can be appreciated that the flowchart of FIG. 5 is non-limiting and alternatives may exist. For example, the order of the operations performed therein can change.

Figure 6:
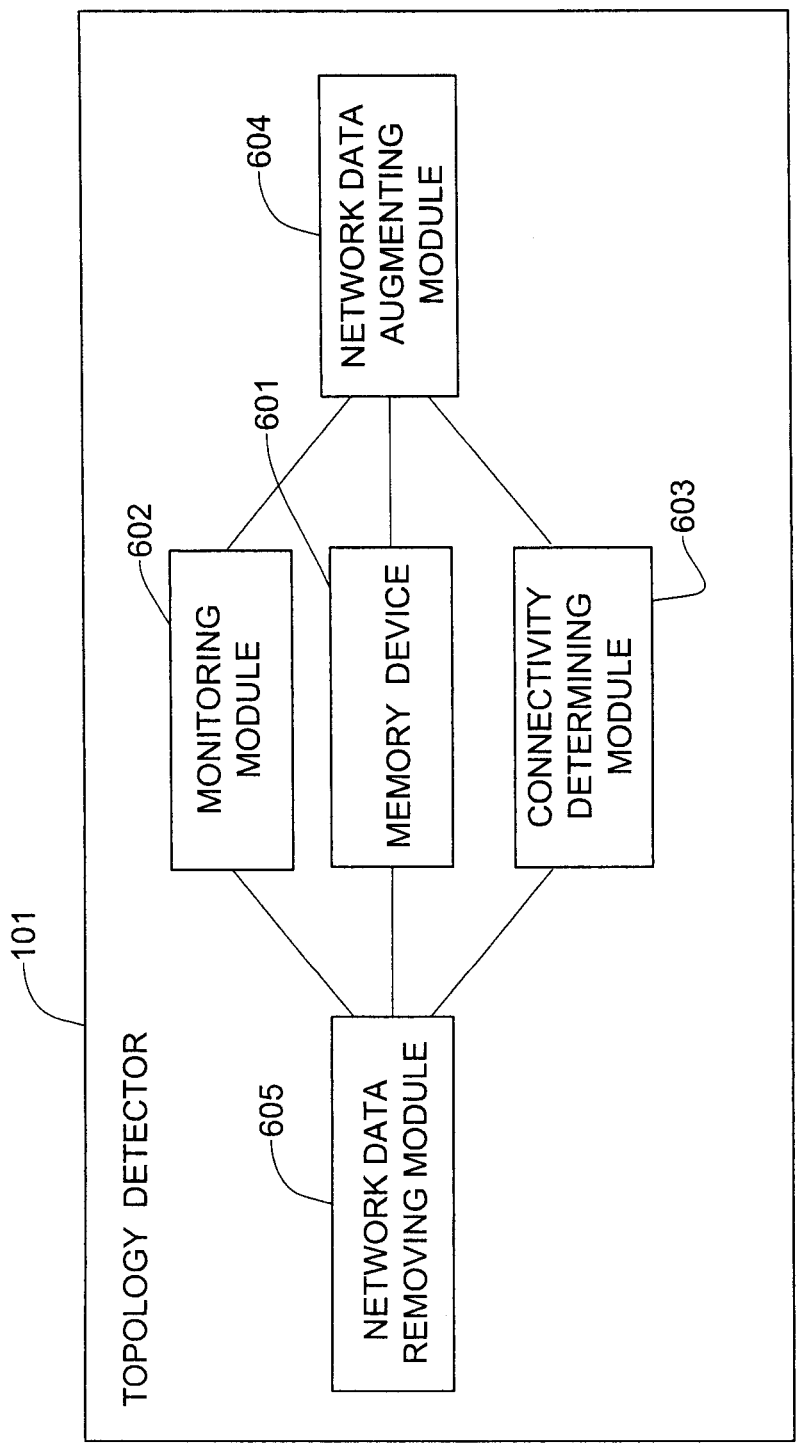
FIG. 6 is a functional block diagram illustrating a topology detector in accordance with certain embodiments of the present invention.

FIG. 6 is a block diagram illustrating a topology detector 101, which is an apparatus for determining topology of a dynamic network, according to certain embodiments of the present invention. The topology detector includes a memory device 601, a monitoring module 602, a connectivity determining module 603, a network data augmenting module 604 coupled to the monitoring module 602 and to the connectivity determining module 603, and a network data removing module 605 coupled to the monitoring module 602 and to the connectivity determining module 603. Each of the monitoring module 602, the connectivity determining module 603, the network data augmenting module 604 and the network data removing module 605 is coupled to the memory device 601.

It was mentioned earlier, with reference to FIG. 2, that the memory device can be a short term memory device (such as Random Access Memory, RAM) or a long term memory device (such as a disk, flash memory etc.). In addition, it should be appreciated that although in the figure one memory device (601) is depicted, there may exist several memory devices, e.g., one for storing node data, one for storing address data and one for storing connectivity data.

According to one embodiment, the monitoring module 602 can be configured to operate in accordance with technique disclosed in WO 2005/053230, in which case it can be the network information collector described therein.

Yet, according to another embodiment, the connectivity determining module 603, can operate, e.g., in accordance with the flowchart illustrated in FIG. 4. The network data augmenting module 604 can perform 205 of FIG. 2, e.g., by storing node data, address data and connectivity data in the proper memory device. Furthermore, the network data removing module 605 can operate, according to one embodiment, in accordance with the flowchart of FIG. 5.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present invention.

It will also be understood that the apparatus according to the invention can be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the claims associated with the present invention.

The invention claimed is:

1. A method of determining a physical connectivity of the new node connected to a dynamic communication network comprising a plurality of connecting nodes each comprising a plurality of ports, the method comprising:
   determining a baseline dataset comprising node data and connectivity data representing all discovered nodes in a dynamic communication network;
   responsive to automatically discovering a new node connected to the dynamic communication network and not represented in the baseline dataset, obtaining address data characterizing a network address of said discovered new node;
   querying all known connecting nodes and generating a port dataset, the port dataset indicating connectivity data for only a subset of all known connecting nodes, the subset representing only connecting nodes having registered address data characterizing the network address of said discovered new node;
   determining, by analyzing the generated port dataset, a directly connected port and respective connecting node to which said discovered new node is directly connected;
   classifying initially the discovered new node as an endpoint node and classifying the port of the respective connecting node as an endpoint port prior to performing a network connectivity analysis;
   reclassifying said discovered new node as a connecting node responsive to results of the network connectivity analysis; and
   reclassifying the directly connected port as an inter-switch port or a switch-router port responsive to results of the network connectivity analysis.

2. The method of claim 1 wherein the act of determining a baseline dataset comprises retrieving the baseline dataset from a memory.

3. The method of claim 1 wherein the network address is a MAC address.

4. The method of claim 1 wherein the port dataset is generated using SNMP MIB data received from the connecting nodes responsive to querying.

5. The method of claim 1 wherein the port dataset is generated in accordance with data received from the connecting nodes by querying via remote log-in into the connecting nodes.

6. The method of claim 1 wherein analyzing the port dataset comprises processing data related to the ports represented in the port dataset in order to discover a port which is not an inter-switch port or a switch-router port, thereby discovering the port directly connected to the discovered new node.

7. The method of claim 1 wherein the dynamic communication network is selected from a group comprising a single-subnet communication network, a multi-subnet communication network, a single VLAN communication network, and a multi-VLAN communication network.

8. A system capable to determine a physical connectivity of a new node connected to a dynamic communication network, the dynamic communication network comprising a plurality of connecting nodes each comprising a plurality of ports, the system comprising one or more processors configured to:
   determine a baseline dataset comprising node data and connectivity data representing all discovered nodes in a dynamic communication network;

obtain, responsive to automatically discovering the new node connected to the dynamic communication network and not represented in the baseline dataset, address data characterizing a network address of said discovered new node;

query all known connecting nodes and receive respective responses, the respective responses indicating connectivity data for only a subset of all known connecting nodes, the subset representing only connecting nodes having registered address data characterizing the network address of said discovered new node; and analyze data from the respective responses to define a directly connected port and respective connecting node directly connected to said discovered new node;

initially classify the discovered new node as an endpoint node and the directly connected port as an endpoint port prior to performing a network connectivity analysis;

reclassify said discovered new node as a connecting node responsive to results of the network connectivity analysis; and reclassify the directly connected port as an inter-switch port or a switch-router port responsive to results of the network connectivity analysis.

9. The system of claim 8 further comprising a memory configured to maintain data related to the known connecting nodes.

10. The system of claim 8 further comprising communication means operative to receive data related to the known connecting nodes from an external memory.

11. The system of claim 8 wherein the network address is a MAC address.

12. The system of claim 8 wherein the port dataset is generated in accordance with SNMP MIB data received from the connecting nodes responsive to querying.

13. The system of claim 8 wherein the port dataset is generated in accordance with data received from the connecting nodes by querying via remote log-in into the connecting nodes.

14. The system of claim 8 wherein the dynamic communication network is selected from a group comprising a single-subnet communication network, a multi-subnet communication network, a single VLAN communication network, and a multi-VLAN communication network.

15. The system of claim 8, wherein the one or more processors are further configured to augment the baseline dataset to include address data and connectivity data associated with the discovered new node.

16. A computer program product embodied on a non-transitory computer readable medium comprising instructions stored thereon, the instruction to cause one or more processors to:

determine a baseline dataset comprising node data and connectivity data representing all discovered nodes in a dynamic communication network;

obtain, responsive to automatically discovering a new node connected to the dynamic communication network and not represented in the baseline dataset, address data characterizing a network address of said discovered new node;

query all known connecting nodes and receive respective responses, the respective responses indicating connectivity data for only a subset of all known connecting nodes, the subset representing only connecting nodes having registered address data characterizing the network address of said discovered new node;

analyze data from the respective responses to identify a port and a connecting node directly connected to said discovered new node;

classify initially the discovered new node as an endpoint node prior to performing a network connectivity analysis;

classify initially the port of the node directly connected to the discovered new node as an endpoint port prior to performing a network connectivity analysis;

reclassify said discovered new node as a connecting node responsive to results of the network connectivity analysis; and reclassify the port of the directly connected node as an inter-switch port or a switch-router port responsive to results of the network connectivity analysis.

17. The computer program product of claim 16, wherein the instructions stored thereon further comprise instructions to cause the one or more processors to augment the baseline dataset to include address data and connectivity data associated with the discovered new node.

18. The method of claim 1 further comprising augmenting the baseline dataset to include address data and connectivity data associated with the discovered new node.

* * * * *

UNITED STATES PATENT AND TRADEMARK OFFICE
CERTIFICATE OF CORRECTION

| | | |
|---|---|---|
| PATENT NO. | : 8,811,224 B2 | Page 1 of 1 |
| APPLICATION NO. | : 12/851415 | |
| DATED | : August 19, 2014 | |
| INVENTOR(S) | : Ofir Arkin | |

It is certified that error appears in the above-identified patent and that said Letters Patent is hereby corrected as shown below:

On the Title page, in item (74), in column 2, in "Attorney, Agent, or Firm", line 1, delete "Cabello." and insert -- Cabello, --, therefor.

In the Claims

In column 10, line 6, in claim 1, delete "of the" and insert -- of a --, therefor.

In column 10, line 13, in claim 1, delete "a new" and insert -- the new --, therefor.

Signed and Sealed this
Tenth Day of February, 2015

Michelle K. Lee
*Deputy Director of the United States Patent and Trademark Office*